(12) United States Patent
Elfimov et al.

(10) Patent No.: US 12,131,873 B2
(45) Date of Patent: Oct. 29, 2024

(54) MODULE FOR A POWER-SAVING DEVICE, METHOD FOR PRODUCING SAME AND POWER-SAVING DEVICE

(71) Applicants: Pavel Vladimirovich Elfimov, St. Petersburg (RU); Vladimir Vladimirovich Elfimov, St. Petersburg (RU); Armen Rudikovich Avetsian, St. Petersburg (RU)

(72) Inventors: Pavel Vladimirovich Elfimov, St. Petersburg (RU); Vladimir Vladimirovich Elfimov, St. Petersburg (RU); Armen Rudikovich Avetsian, St. Petersburg (RU)

(*) Notice: Subject to any disclaimer, the term of this patent is extended or adjusted under 35 U.S.C. 154(b) by 17 days.

(21) Appl. No.: 17/778,023

(22) PCT Filed: Aug. 9, 2020

(86) PCT No.: PCT/RU2020/050183
§ 371 (c)(1),
(2) Date: May 19, 2022

(87) PCT Pub. No.: WO2021/101412
PCT Pub. Date: May 27, 2021

(65) Prior Publication Data
US 2022/0367124 A1 Nov. 17, 2022

(30) Foreign Application Priority Data
Nov. 19, 2019 (RU) .................. 2019137118

(51) Int. Cl.
*H01G 9/145* (2006.01)
*H02J 15/00* (2006.01)
*H02N 3/00* (2006.01)

(52) U.S. Cl.
CPC ............ *H01G 9/145* (2013.01); *H02J 15/00* (2013.01); *H02N 3/00* (2013.01)

(58) Field of Classification Search
CPC .. H01G 9/145; H01G 9/07; H01G 9/08; H02J 15/00; H02N 3/00
(Continued)

(56) References Cited

U.S. PATENT DOCUMENTS

2010/0134949 A1* 6/2010 Choi .................... H02N 11/002
361/301.2
2018/0130598 A1* 5/2018 Lestician ................. H01F 3/10

FOREIGN PATENT DOCUMENTS

KR 100638051 B1 * 5/2007
RU 124979 U1 * 2/2013

* cited by examiner

*Primary Examiner* — Arun Ramaswamy
(74) *Attorney, Agent, or Firm* — Rivka Friedman

(57) ABSTRACT

The disclosure provides a chemical reduction of a metal in a cable of an electrical network, which brings about an improvement in the conductive properties of said metal and a reduction in losses during electric power transmission. The invention discloses a reducing compound with a high concentration of quasi-free electrons, which is obtained as a result of the solvation of metals selected from group I and group II of the main group of the periodic table of elements and of amines selected from the group consisting of: pyridine, and dimethylformamide dispersed in a liquid oligomer, with a metal:amine:dielectric molar ratio of 1:2:1.5, allowing, in an alternating electromagnetic field, to initiate a pulsed injection of electrons into the network with a periodicity equal to frequency of alternation of the voltage.

6 Claims, 7 Drawing Sheets

Figure 1:
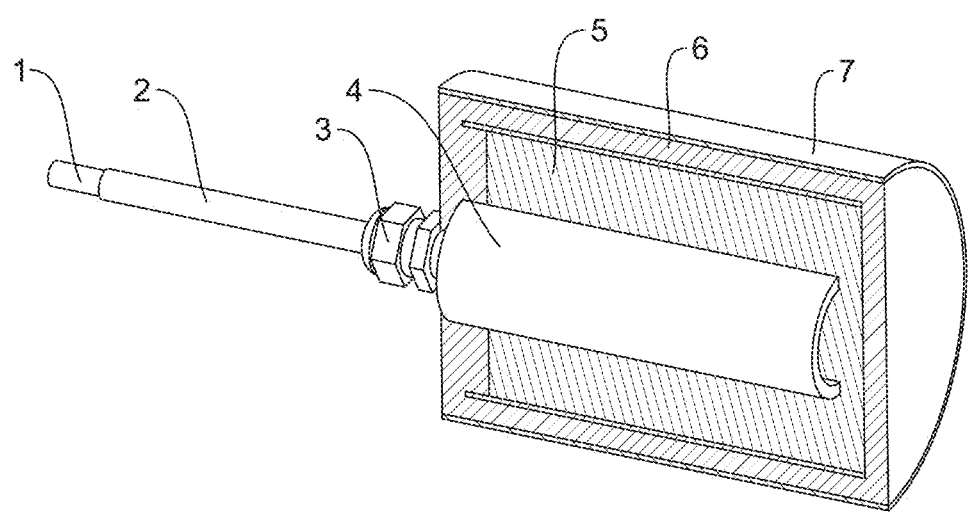

(58) Field of Classification Search
USPC .................................................. 361/502, 503
See application file for complete search history.

MODULE FOR A POWER-SAVING DEVICE, METHOD FOR PRODUCING SAME AND POWER-SAVING DEVICE

The technical solutions proposed for protection relate to electrical engineering, in particular to electrical devices designed to generate electric current and transmit it to the consumer circuit. The claimed technology is based on the accumulation of free electrons that create a volumetric negative charge.

The element of the device in which the formation and accumulation of free electrons occurs is usually called a module. Combining modules into a specific system allows you to form a device (energy-saving device, ESD) for accumulation and transmission of current to the consumer. Analysis of information on classes related to the means of obtaining additional energy supply to the consumer showed that most use the principle of accumulating electricity in special devices or circuits.

An example of the accumulation of electricity by means of a capacitor built into an electrical circuit is the patent of the Russian Federation 15579. A device is described in which a power source containing an electric battery connected via terminals by a conductive circuit with a "load", characterized in that it is equipped with a capacitor with a capacity of 1 or more farad, connected in parallel to the battery, while the capacitor is pre-charged to the voltage at the battery terminals.

RF patent 2466495 . . . describes the METHOD OF ACCUMULATION OF ELECTRICITY AND ELECTRICITY STORAGE OF CAPACITOR TYPE (ESCT). The method is based on the accumulation of charges of free electrons in a vacuum, creating a volumetric negative charge in a "vacuum capacitor" (VC). In this invention, an element of the device intended for the accumulation of electrons is called a "storage device". The method of accumulation of electrical energy consists in the fact that the anode is placed outside the vacuum chamber with the cathode, and a dielectric is placed between them, and the energy is accumulated by accumulating free electrons in a deep vacuum around the cathode. A feature of the claimed ESCT is a vacuum capacitor (VC), which contains a heated cathode with an electrically insulated glow or a cold cathode with a micropike surface that gives up electrons to accumulate charge-electricity in a vacuum in a dielectric sealed cylinder.

The disadvantage of the development is the complexity of such technology, the release of a large amount of heat, therefore, standard air or oil-type cooling systems for VC are provided, as well as the appearance of X-ray radiation, which requires shielding protection, is also possible.

RF Patent 2449450 describes a module for storing electricity. In this invention, as well as in some others, "electric energy storage devices" means either a capacitor (that is, a passive system containing two electrodes and an insulator), or a supercapacitor (that is, a system containing two electrodes, an electrolyte and a separator), or a lithium battery type battery (that is, a system containing an anode, cathode and electrolyte solution).

The development of devices for storing electricity is based on the principle of its "conservation", i.e., initially electricity is consumed to charge the accumulating device, and only then it is returned to the consumer.

There are known devices for obtaining electricity from other sources. For example, RF Patent 2420824 describes a system for supplying additional energy to equipment from a fuel cell stored in a battery and a power module through an executive capacitor. The invention relates to power supply systems used to supply energy to equipment on a high-voltage platform. The system contains a fuel cell and an executive capacitor. According to the invention, the system contains an intermediate battery and a power module. This module is supplied with energy from a fuel cell and energizes an executive capacitor through an electric power conversion module. The technical result is a reduction in the cost of equipment and a reduction in the time of energy transfer to the charged capacitor.

Original developments on the use of alternative sources of electrical energy for the appearance of free electrons and the formation of a charge in the "storage" of steel are carried out in Japan and Korea. The published international application WO2008/133438 provides information on the use of natural minerals tourmaline and morganite as energy carriers.

The inventor has developed a new material and a device capable of improving the flow of current. That is, the inventor drew attention to the aspect that the movement and flow of electrons can be improved by using the mineral tourmaline, which has constant electrical properties. Accordingly, the inventor has developed a device to save electricity by improving the movement and flow of electrons using a mixture of the mineral tourmaline, which has a constant electrical property, and a permanent magnet powder, which creates a constant magnetic field. In accordance with U.S. Pat. No. 8,310,803 (which was issued in accordance with the international application WO2008/133438), the electron generation and accumulation module is made in the form of a rectangular box with a lid and includes: a housing, an intermediate layer of tourmaline consisting of a mixture of tourmaline powder, permanent magnetic powder and water ($H_2O$), ionization plates located on the upper and lower surfaces of the intermediate layer of tourmaline, and a conductive plate integrated into the intermediate layer of tourmaline. Ionization plates are made of copper or aluminum, and the conductive plate is made of pure copper and bonded to an electrical wire to transfer energy to the consumer. The formation of a device for saving electricity from single modules is carried out in accordance with the type of electrical network of the consumer. When the network is a single-phase two-wire system, two modules are used. When the power grid is a three-phase four-wire system, four modules are used.

This patent can be considered as the closest analogue of the claimed development, since in it, as well as in the technology we propose, the principle of obtaining additional electricity from unconventional sources is implemented, representing (with a certain combination of components inside the housing) a working active composition that initiates the formation of free electrons, which, when they enter the electrical network, contribute to the restoration of metal conductors in this network.

However, the manufacturing technology of the module for generating free electrons, set out in U.S. Pat. No. 8,310,803, as well as the application WO2008/133438 is not specific, the design description does not give a clear idea of the device of the module-generator of free electrons. In particular, the phrase: "the housing of the housing" allows us to understand it as a box with double walls; its manufacture can only be carried out by manual assembly for demonstration purposes or single laboratory tests. The significant disadvantages of this module are: the leaky housing of the module, the small temperature range of use of the device—because there is water in the compound that freezes below 0° C.; exhaustion of the components of the compound in a short time—magnetic powder (metal) actively interacts with water in an electric field, mutually destroying each other.

Speed corrosion in an aggressive environment of solutions of boric aluminosilicates in water of all metal components: from the current collector to ionization plates—with the failure of the device. The initial variability of the composition of the compound (undivided dumps from quarries of tourmaline and morganite are used as raw materials, sometimes with radioactive radiation) with a corresponding variability of properties. There are no quantitative dependencies: composition—properties. The composition of the compound causes a low breakdown voltage of the device with subsequent failure of electrical equipment and devices. Namely: the presence of water, magnetic (metal) powder, the geometry and device of the module, which is a flat box containing a copper plate electrode and copper ionization plates placed on the inner planes of the bottom and lid of the box, with a small distance between the electrode and the ionization plates—all this makes the module conductive, and unstable to electrical breakdown.

The same ionization plates shield the electromagnetic field, the maximum of which could arise between the modules and would contribute to more efficient operation of the modules (by pumping electrons into the network) with their optimal arrangement in space.

The service life of the ESD is 1-1.5 years; further, the destruction of the internal environment, even if the device was not used for its intended purpose.

The purpose of the claimed technical solutions is the development of a more advanced manufacturing technology for the module, the development of a formulation and technology for the synthesis of a reducing compound and the installation of an energy-saving device (ESD) for its industrial application.

The problem was solved by using as a constructive form of the module housing to accommodate an active working medium in it—a hollow, thick-walled, monolithic, sealed, highly insulating cylinder equipped with a tubular (cylindrical) current collector electrode with a diameter of d 1=0.25 of the diameter of the module cylinder, and a height of h=0.75 of the module height, connected by an electrical cable to the buses of the power grid, and as an active working medium with a high concentration of free electrons—a reducing compound in the form of an emulsion of an amine solution of electrons based on compounds selected from the group: pyridine, dimethylformamide, etc., and metals selected from the first and second groups of the main subgroup of the Periodic Table (for example, Li, Ca) in a liquid dielectric oligomer with a permittivity from 1 to 3, in a molar ratio of metal:amine:dielectric 1:2:1.5, which allows, when introduced into an alternating electromagnetic field, to initiate pulsating injection of electrons into the network at the moments of the positive phase of the voltage sine wave, with a frequency equal to the frequency of voltage change. (The procedure for the synthesis of a reducing compound is described in Appendix No. 1). In addition, by assembling modules into an energy-saving device (ESD) by arranging: 4 modules (three-phase network) into a spatial group according to one of three options: —in the form of a regular triangular pyramid—tetrahedron, or—a flat square, or—a flat rectangle; or 2 modules (single-phase network)—in line. The distance between the modules in all variants should be at least 4 cylinder diameters of the module with the compound from each other.

The achieved technical result in the implementation of design solutions and the use of a new type of reducing compound that provides a high concentration of free electrons for the subsequent chemical recovery of the metal of the power grid is a highly productive manufacturing technology of the module, which increased its productivity, power and durability, improving its electrical insulation properties, expanding the temperature range of use and making possible a faster output of an energy-saving device (ESD) on the mode of saving electricity, which ultimately determines its practical implementation among consumers.

FIGS. 1-7 show explanatory drawings and diagrams illustrating the claimed technologies, formulations and device diagrams.

FIG. 1 shows the module in the section. It contains a conductive electrode (4) in the form of a copper tube with a diameter of 0.25 of the diameter of the module and a length of h=0.75 of the height of the module. The coaxiality of the electrode and the cylinder of the module makes the current collector electrode equidistant from the outer walls of the housing, giving the module increased electrical insulation. An electrical cable (2) with a stripped end (1) is attached to the current collector electrode (4), intended for connection to the consumer's power grid buses. The cable is brought out through the end cap and secured with a threaded gland (3). The internal space of the module and the tube of the current collector electrode is filled with a reducing compound (5)—an inverted emulsion obtained from an amine solution of electrons dispersed in a viscous (15 . . . 20 Pa·s), chemically inert oligomer with a dielectric constant $\varepsilon$=1 . . . 3; housing of the module (6) is formed by an epoxyurethane composition (EUC) poured into a mold of two PVC tubes inserted into each other (7). The dimensions of the module for a specific case are determined by calculation depending on the power consumption of the object, based on the ratio: 0.06 kg of the reducing compound per 1 kW of power consumption. For example, for an electric grid consuming 100 kW, the required weight of the electric generating compound should be 6 kg, and since the density of the compound is 1.7 . . . 2.1 kg/dm$^3$, then the internal volume of each of the 4 modules should be 0.8 dm$^3$, i.e., in diameter 100 mm and height 100 mm.

The module works only in sets: either of 4 modules (three-phase network), or of 2 modules (single-phase network) that make up energy-saving devices (ESD), when they are connected to an alternating voltage network. This initiates a pulsating injection of electrons from the reducing compound into the network at the moments of the positive phase of the voltage sine wave, with a frequency equal to the frequency of voltage change, for example, 50 Hz.

The module is manufactured by performing sequential assembly operations into a single complex. First of all, based on the energy consumption parameters of a potential object, the physical dimensions of the module housing and the volume of its internal space are calculated. Here we describe the manufacture of a module with a capacity of 100 kW, that is, its external dimensions are ø=100 mm and h=100 mm. The housing is formed from two plastic pipes inserted into each other, with a difference in diameter of at least 20 mm, moreover, the inner pipe of a smaller diameter is shorter than the outer pipe by 30 mm. The larger of the pipes is installed vertically on the support plate. An epoxy polyurethane 2-component curable composition is poured into the base, which, after curing, forms the lower fragment of the cylindrical housing of the module—the bottom with a thickness of 15 mm. After 4 hours of exposure of the cured composition, but no later than a day after pouring (so that the epoxy-polyurethane composition does not gain 100% rigidity), a hole is drilled in the center of the bottom of the required diameter; in our case, 18 mm, and a metric thread M20×1.5 is cut under the stuffing box for insertion and subsequent fixing of the cable. 75 mm of copper tube is cut off for the future current collector electrode with a diameter of 25 mm and a wall thickness of 2 mm and a hole with a diameter of 8 mm is drilled in the side surface of the tube at a distance of 45 mm from the lower end, on which two triangular recesses are cut for the free flow of the epoxyurethane composition (EUC). A single-core, multi-wire, copper cable (with a cross section of 35 mm$^2$ and a length of 500 mm) is prepared, stripped off the insulation of 25 mm and pressed on the cable tip, then attaching it from the inside to a piece of copper tube (current collector electrode) using a standard bolt connection with an M8 thread. A cable with a fixed current collector electrode is stretched through the stuffing box and the nut is tightened on the stuffing box, fixing the copper electrode and cable. A plastic pipe of 20 mm smaller diameter and 30 mm lower height is inserted coaxially into the cylinder, at the lower end of which two triangular recesses are made for the flow of the EUC. Fixing spacers for coaxiality are inserted between the cylinders, after which they are inserted into the inner space of the 5 mm thick EUC module, which allows fixing the central current collector electrode and the inner coaxial pipe inside the module in the desired spatial position, as well as sealing the cable outlet. The adhesive mixture is kept for at least 4 hours. Fill the inner volume of the cylinder with a pre-synthesized reducing compound to the upper end of the inner coaxial pipe.

The meaning of the preparation of a reducing compound is in the dissolution of alkaline (group 1 of the main subgroup of the Periodic table) or alkaline earth metals (group 2 of the main subgroup) in an amine solvent to form a solution of solvated electrons [B. V. Nekrasov. "Fundamentals of General Chemistry". Publishing house "Chemistry", M., 1969, vol. 1, p. 386], [Yu. Ya. Fialkov, "Not only in water", L-d, "Chemistry", Leningrad, 1989, 2nd Edition, p. 84].

The compound is covered with a thin circle of cardboard and filled with EUC, which, when cured, forms a cylindrical wall and the upper cover of the module housing, thereby completing the formation and sealing of the module housing.

After holding the adhesive composition for a day, the module for subsequent assembly of the ESD is ready.

The module's operability is checked using an oscilloscope when it is connected to a set of modules of an energy-saving device (ESD). When the switch connecting the ESD to the power grid is closed, and the oscilloscope probe contacts the module under test, in case of its operability, a 2-4 fold increase in the amplitude of the amplitudes of the sinusoidal voltage graph is observed on the oscilloscope screen.

Figure 2:
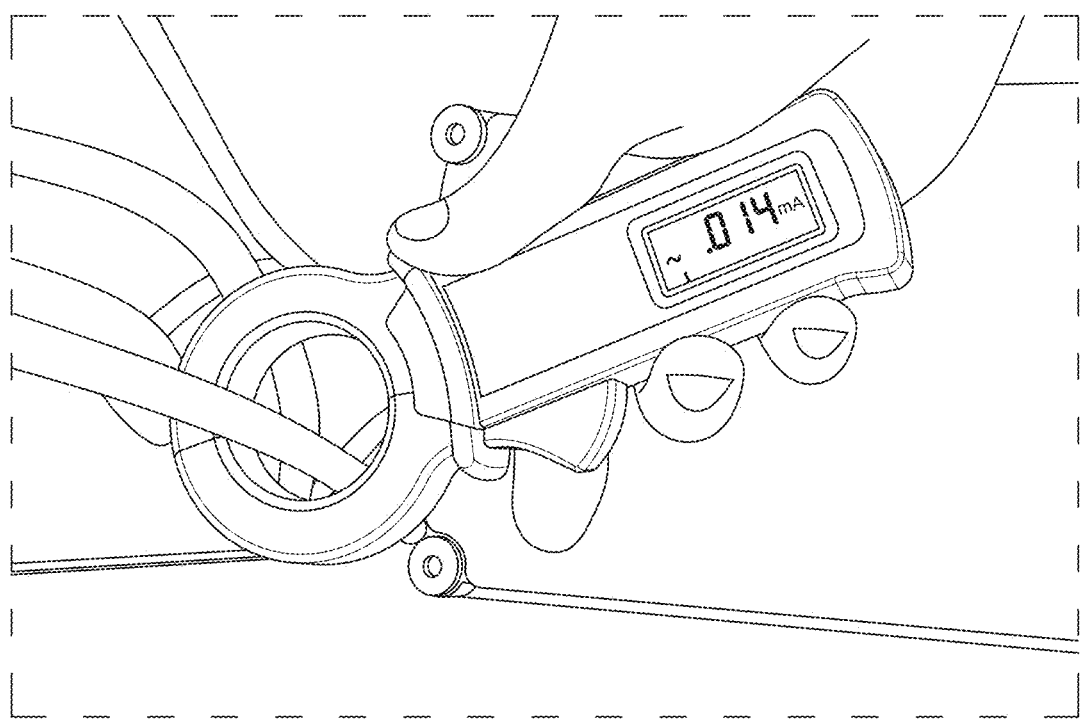

A parallel method of checking the module's operability is by placing current tongs—a device for measuring leakage currents (for example, FLUKE 360) on the cable coming out of the module—FIG. 2. In the case of normal operation of the test module, the current flow from the module to the power supply bus with a value in the range of 0.01 . . . 0.1 mA (milli Ampere) is observed on the device screen. The current strength from the module depends on the dimensions, the mass of the ESD and the spatial location of the modules. The minimum value of 0.01 mA is fixed when the ratio is reached: compound mass/ESD power=0.06 kg/1 kW. The electronic compound inside the module stores the charge until it is consumed. The module is undismountable and, after the exhaustion of the electronic resource, is subject to disposal as household waste.

3. Energy-Saving Device (ESD).

The ESD is created by combining modules into sets: either from 4 modules (three-phase network), or from 2 modules (single-phase network). Each module is connected via a current collector electrode with a cable to the phases and zero of the consumer's power grid.

The effective operation of the ESD is achieved by adjusting the modules. At the moment of the optimal geometry of the frame of the modules, a voltage resonance occurs, which is fixed on any of the modules in the kit using an oscilloscope. On the oscilloscope screen, there is a three-fourfold increase in the amplitude of the sinusoidal voltage graph.

In the case of a three-phase network, the ESD is composed of 4 modules, the layout of which in space is possible according to one of three options:

1. —in the form of a regular triangular pyramid—tetrahedron, namely: so that 3 modules connected to the 3rd phases of the power grid are at the base of the pyramid, and the "neutral" module is at the top of the pyramid. Moreover, the length of each side of the regular triangles of the sides of the tetrahedron should be 4 diameters of the cylinder of the module with the compound, and the geometric center of each module should be located at the intersection point of the faces of the pyramid; in this case, a 4-fold multiplication of the amplitude of the voltage sine wave is observed.
2. —in the form of a flat square with the length of each side—4 cylinder diameters of the module with a compound; the geometric center of each module should be located at the intersection of the sides; in this case, a 2.5-fold multiplication of the amplitude of the voltage sine wave is observed.
3. —in the form of a flat rectangle with a side length of at least 4 diameters of the cylinder of the module with a compound; the geometric center of each module should be located at the intersection point of the sides; in this case, a 2-fold multiplication of the amplitude of the voltage sine wave is observed.

Figure 3:
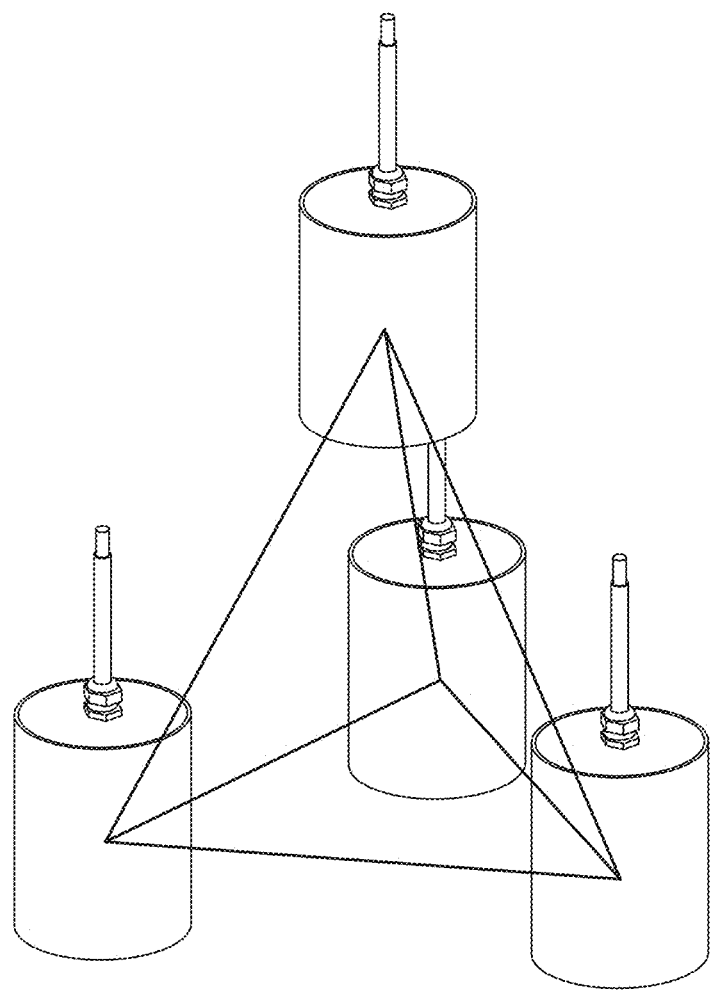

That is, the preferred arrangement of 4 modules in space is in the form of a regular triangular pyramid—tetrahedron—FIG. 3, but this is not always possible due to the dimensions and mass of the developed ESD (see Table. 2 in the Appendices).

It should be explained that the greater the amplitude of the sinusoidal voltage curve, the greater the gradient of the positive (+) branch of the sinusoid voltage will be in the conductor, with greater force drawing a cloud of electrons from the reducing compound, and the greater the current will be observed in the cable from the module to the power bus—Table 1.

TABLE 1

The dependence of the voltage multiplication in the ESD and the current strength from the module to the network on the spatial location of the modules in the ESD. ESD power = 100 kW.

| Module frame configuration | The value of the initial voltage, V | Multiplicity of voltage increase, n | The current from the module to the network, m A |
|---|---|---|---|
| Arbitrary | 1 | 1 | 0 |
| Tetrahedron | 1 | 4 | 0.1 |
| Square | 1 | 2.5 | 0.03 |
| Rectangle | 1 | 2 | 0.015 |
| In line | 1 | 2 | 0.01 |

Ratio: compound mass/ESD power = 0.06 kg/1 kW.

In the case of a single-phase network, there is one option for the arrangement of modules in space—in a line, at a distance of 4 cylinder diameters of the module with the compound from each other. In this case, there is a 2-fold multiplication of the amplitude of the voltage sine wave.

Modules grouped according to one of 4 variants are placed in a metal container for shielding from external electromagnetic fields. The effect of placing in a metal container +~10% of the amplitude of the electromagnetic field generated by the compound. To adjust the module system the ESD resonates with the oscilloscope probe of one of the modules and the modules with phases and zero are moved towards the center and from the center of the ESD until a steady maximum of the voltage amplitude is observed. In the case of a tetrahedron, this is a 4-fold multiplication of the initial voltage amplitude—FIG. 6. After that, the modules are fixed in the found position with the help of clamps attached to the walls of the metal container—FIG. 7.

Figure 4:
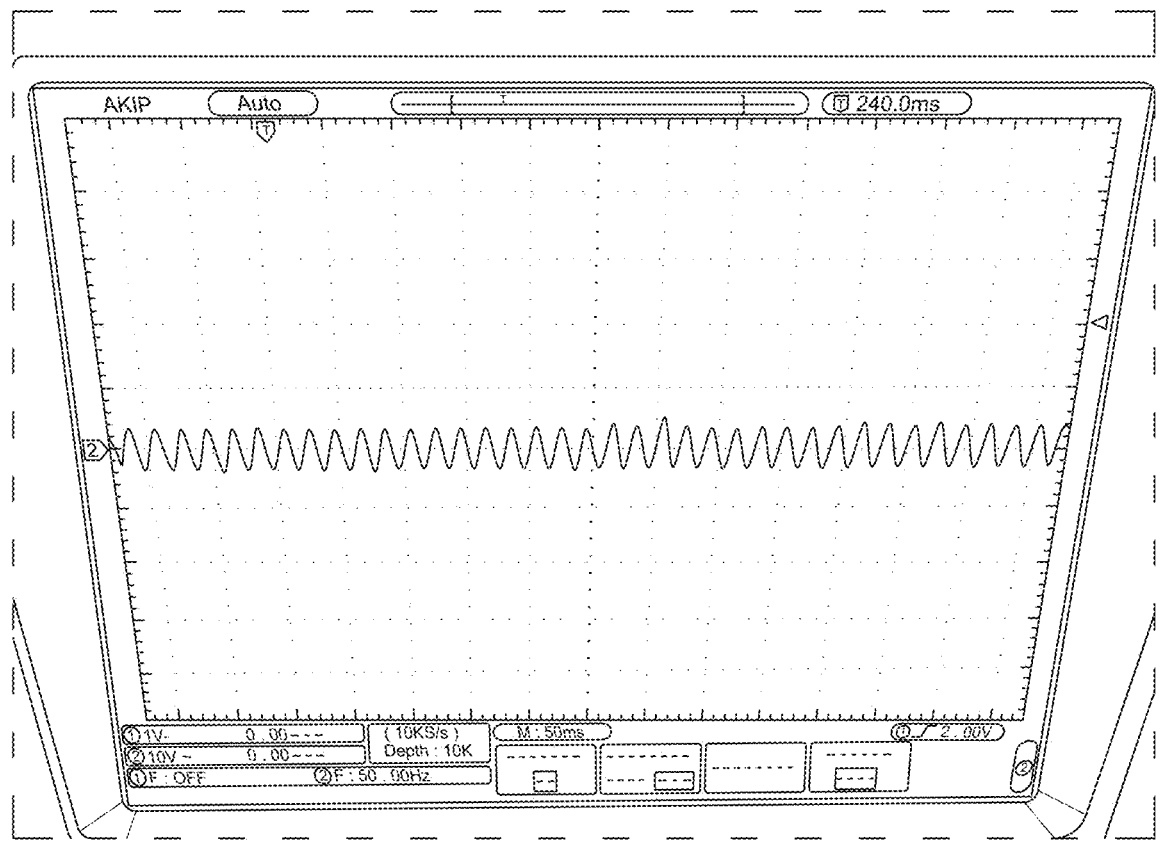
Figure 5:
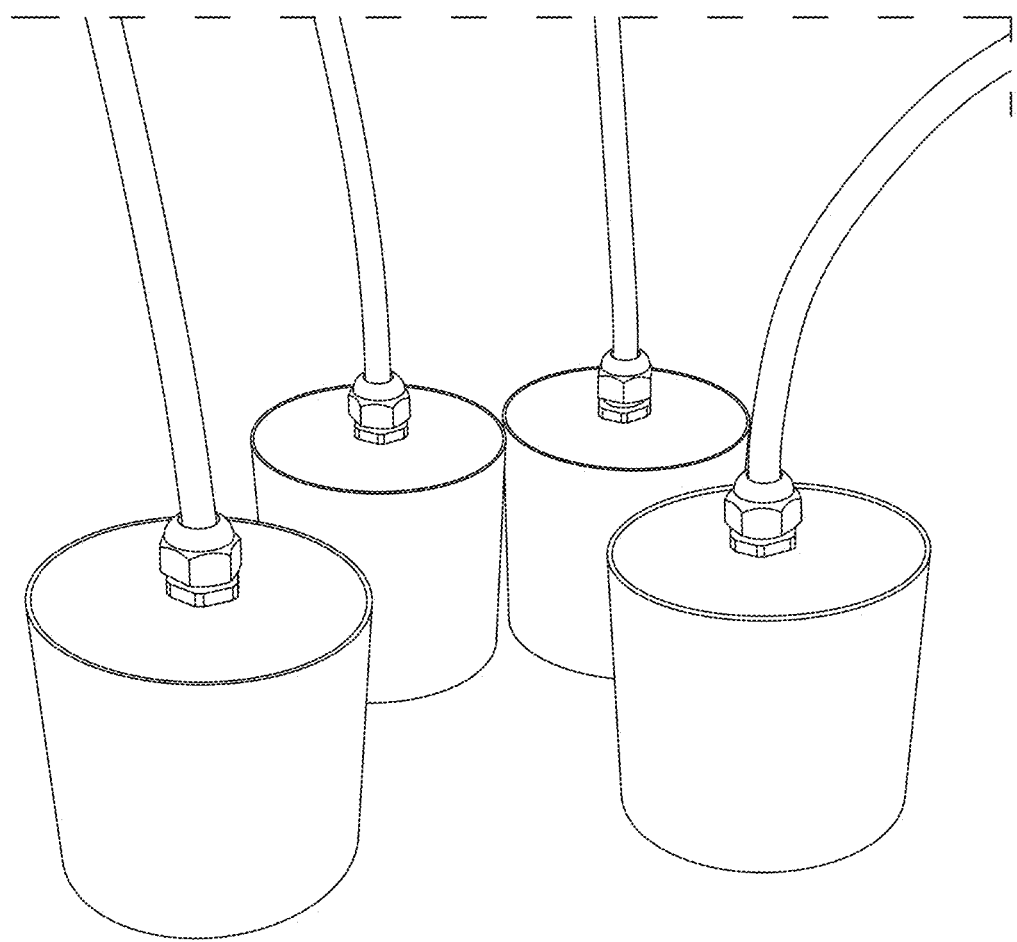
Figure 6:
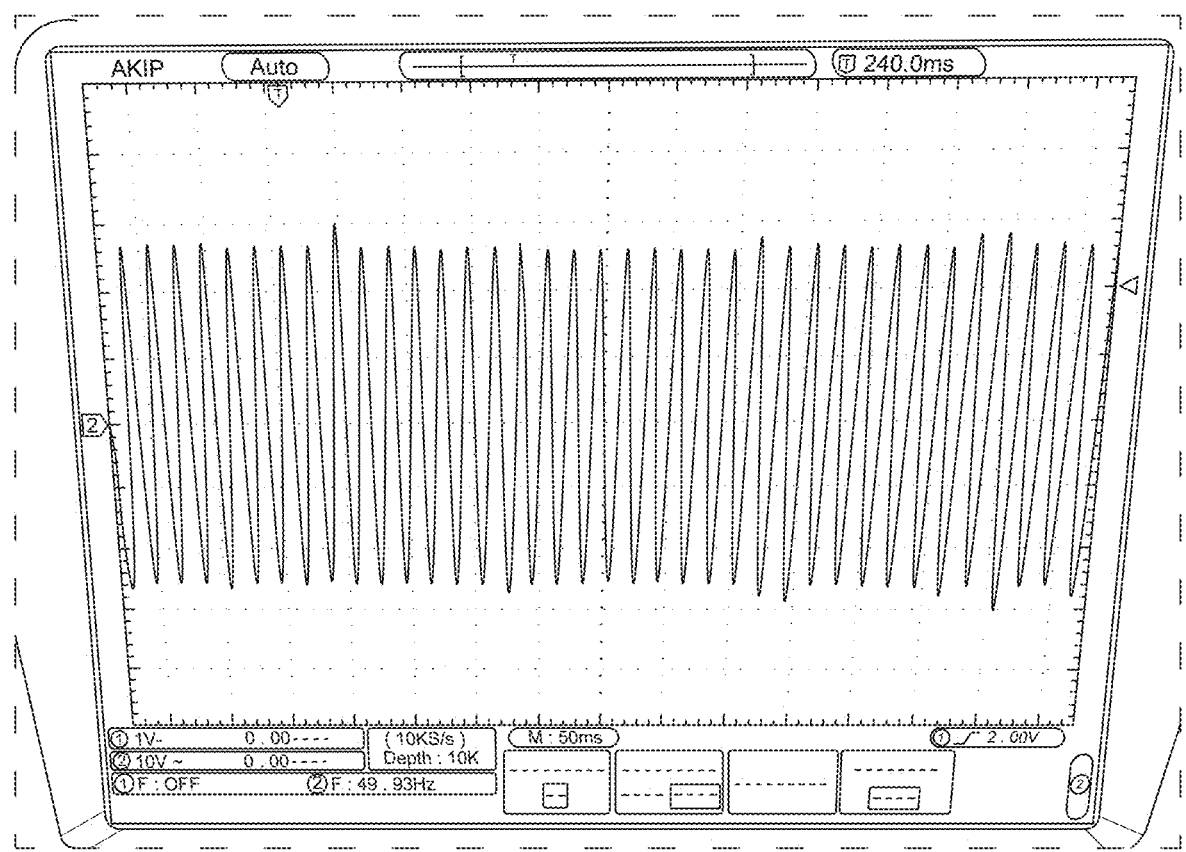
Figure 7:
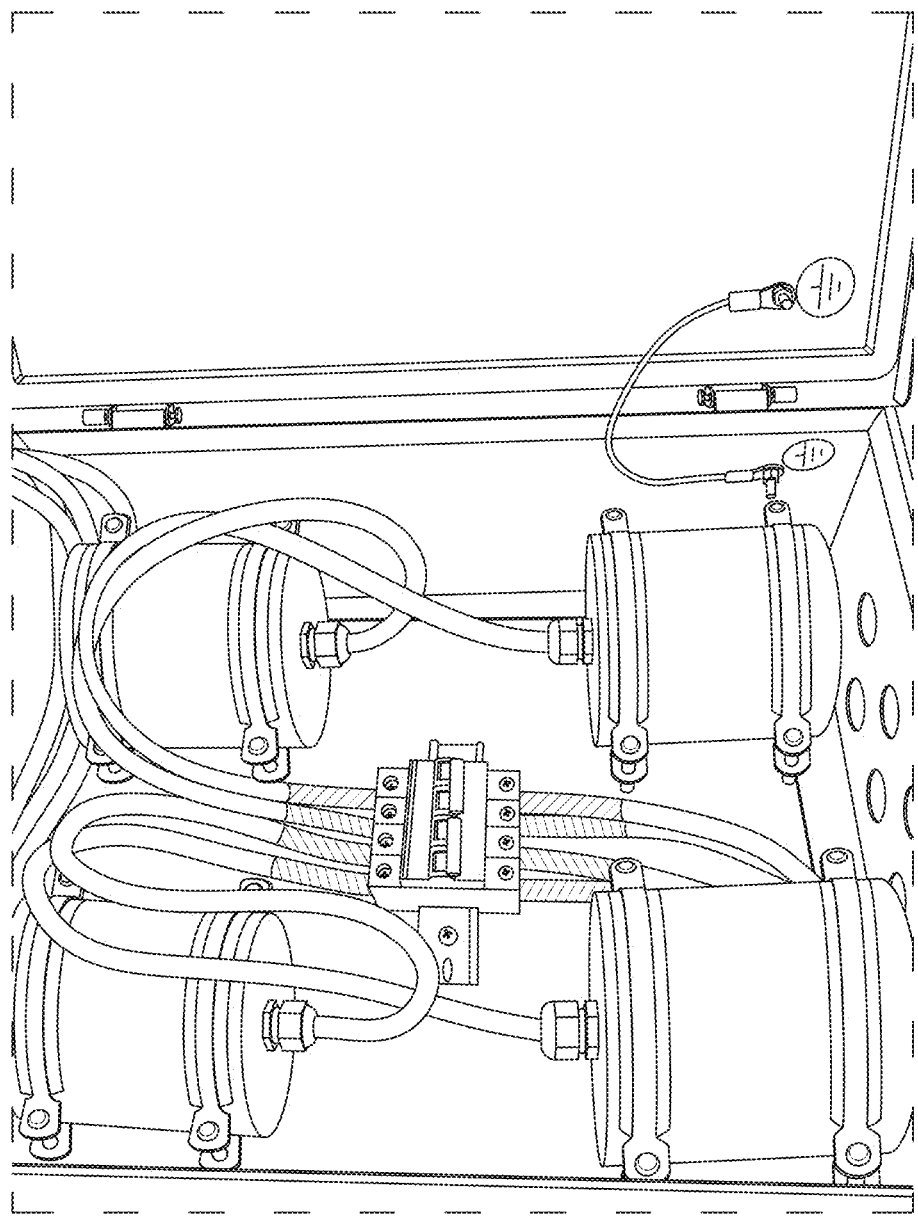

FIG. 4 shows the type of voltage amplitude with an arbitrary arrangement of modules in space, one of the variants of which is shown in FIG. 5.

The efficiency of the ESD is confirmed by the experience of operating the equipment from real customers, where a decrease in electricity consumption and, accordingly, a decrease in electricity payments were recorded.

Thus, the developed more advanced manufacturing technology of the module, the developed formulation and synthesis technology of a reducing compound accumulating a high concentration of electrons for subsequent chemical recovery of the metal of the power grid, embodied methods of installation and tuning into resonance of an energy-saving device that can be used in industry to save electricity, expanding the temperature range of the device, increasing its electron-generating activity and productivity, increased product life—provided stable and reliable operation of the ESD. This system has received the commercial designation NRG ("En—Er—Gi").

The technical result—due to the chemical reduction of the metal conductor—improved its conductive properties, which allowed to reduce energy costs for the transmission of electricity and ensure its savings.

Currently, pilot batches of devices are being produced to order on a contractual basis. The pilot production is functioning and includes an assembly line, a laboratory section and a quality control section.

What is claimed is:

1. A module of an energy-saving device (ESD) for generating electrical energy, consisting of a housing and an active working composition in it capable of accumulating free electrons and transmitting them through a current-carrying electrode and an electrical cable connected to it to consumer's buses, characterized in that the housing is made in the form of a hollow, thick-walled, monolithic, tight, highly insulating cylinder formed by a dielectric polyurethane system, and the current-carrying electrode is made of a copper tube with a diameter of 0.25 of the diameter of the cylinder of the module and a height of 0.75 of the height of the cylinder of the module, as an active working medium with a high concentration of free electrons, the inner space of the housing is filled with a reducing compound in the form of an emulsion of an amine solution of electrons based on amines selected from the group: pyridine and dimethylformamide and metals selected from the group: Li, Na, K, and Ca, in a liquid dielectric oligomer with a permittivity from 1 to 3, in a molar ratio of metal:amine:oligomer-dielectric=1:2:1.5, which allows, when introduced into an alternating electromagnetic field, to initiate pulsating injection into the network electrons at the moments of the positive phase of a voltage sine wave, with a frequency equal to the frequency of a voltage change while, dimensions of the housing and the volume of its internal space are set depending on the magnitude of an expected energy consumption.

2. The module according to claim 1, characterized in that the oligomer polyvinylidene fluoride having kinematic viscosity 15-20 Pa*s is used as a dielectric.

3. A method of manufacturing the ESD module as claimed in claim 1, consisting in the formation of a vessel with a reducing compound, characterized in that the vessel body is cast from a curable epoxyurethane electrical insulation composition, forming from it sequentially: a round bottom 15 mm thick, a side cylindrical wall 10 mm thick (by pouring the composition between two coaxial pipes made of polar plastic, said composition comprising polyvinyl chloride or polystyrene having a difference in diameters and heights: 20 and 30 mm, respectively) and a round top cover with a

TABLE 2

The list of typical installations NRG, the ratio of the amount of the reducing compound/the power of the consumer's power grid, the parameters of individual modules as part of the ESD.

| NRG system TYPE | POWER, kW | CABLE LENGTH, m | CABLE SECTION, mm² | Module SIZE (Ø, height), mm | Weight of the reducing compound in the set of modules, kg |
|---|---|---|---|---|---|
| SINGLE-PHASE | 5 | 1 | 8 | 70 * 90 | 0.15 |
| (set of two units) | 10 | 1 | 8 | 70 * 140 | 0.3 |
| THREE-PHASE | 10 | 3 | 8 | 70 * 90 | 0.6 |
| (set of four units) | 20 | 3 | 25 | 70 * 140 | 1.2 |
| | 30 | 3 | 25 | 70 * 170 | 1.8 |
| | 50 | 3 | 25 | 100 * 130 | 3.0 |
| | 75 | 3 | 25 | 100 * 150 | 4.5 |
| | 100 | 3 | 35 | 120 * 125 | 6.0 |
| | 200 | 3 | 35 | 120 * 200 | 12.0 |
| | 300 | 3 | 35 | 120 * 300 | 18.0 |
| | 400 | 3 | 35 | 150 * 280 | 24.0 |
| | 500 | 3 | 35 | 200 * 210 | 30.0 |
| | 750 | 3 | 35 | 200 * 300 | 45.0 |
| | 1,000 | 3 | 35 | 200 * 400 | 60.0 | thickness of 15 mm, followed by curing to obtain a monolith; through the bottom of the vessel, a cable is withdrawn, electrically connected to the current-collecting internal electrode from a copper tube with a diameter of 0.25 from the internal diameter of the module cylinder and a height of 0.75 from the internal height of the module cylinder;

the inner space of the formed vessel is filled with a reducing compound—an emulsion of an amine solution of electrons based on compounds selected from the group: pyridine, dimethylformamide, and metals selected from the first and second groups of the main subgroups of the Periodic Table, comprising Li, Ca, in a liquid dielectric oligomer with a permittivity from 1 to 3, in the molar ratio metal:amine:dielectric 1:2:1.5, which allows, when introduced into an alternating electromagnetic field, to initiate a pulsating injection of electrons into the network at the moments of the positive phase of a voltage sine wave, with a frequency equal to the frequency of voltage change.

4. The method according to claim 3, characterized in that the dimensions of blanks for a housing and its volume is determined by calculation, based on the power consumption at the facility at a ratio of 0.06 kg of reducing compound per 1 kW of power consumption.

5. An energy-saving device (ESD) is created by combining modules as claimed in claim 1 with an electron-generating compound into sets: either from 4 modules {three-phase network), or from 2 modules (single-phase network), and connecting the current collector electrodes of each module through electrical cables to the consumer's power supply buses, characterized in that in the case of a three-phase network, the ESD is composed of 4 modules, the layout of which in space is possible according to one of three options:

1.—in the form of a regular triangular pyramid—tetrahedron, so that 3 modules connected to the 3 phases of the power grid are at the base of the pyramid, and a "neutral" module—at the top of the pyramid, moreover, the length of each side of the regular triangles of the sides of the tetrahedron is 4 diameters of a cylinder of the module with the compound, and the geometric center of each module must be located at the intersection point of the faces of the pyramid;

2.—in the form of a flat square with the length of each side of 4 cylinder diameters of the module with the compound; the geometric center of each module is located at the intersection of the sides;

3.—in the form of a flat rectangle with a side length of at least 4 diameters of the cylinder of a module with a compound; the geometric center of each module is located at the intersection of the sides, in the case of a single-phase network, the ESD is composed of 2 modules in a line at a distance from each other of 4 cylinder diameters of the module.

6. The device according to claim 5, characterized in that modules arranged in the form of a particular figure are placed in metal containers.

* * * * *